United States Patent
McLeod (10) Patent No.: US 7,164,742 B2
(45) Date of Patent: Jan. 16, 2007

(54) DESKEW ARCHITECTURE

(75) Inventor: Gordon R. McLeod, Linlithgow (GB)

(73) Assignee: Intel Corporation, Santa Clara, CA (US)

( * ) Notice: Subject to any disclaimer, the term of this patent is extended or adjusted under 35 U.S.C. 154(b) by 792 days.

(21) Appl. No.: 10/284,575

(22) Filed: Oct. 31, 2002

(65) Prior Publication Data

US 2004/0088598 A1    May 6, 2004

(51) Int. Cl.
  *H04L 7/00* (2006.01)
(52) U.S. Cl. .................. 375/355; 714/700; 713/503
(58) Field of Classification Search ............ 375/360, 375/354, 373, 376, 362, 371, 375, 355, 335, 375/240.28; 327/141, 144, 91, 156, 158; 370/503; 713/400, 503; 714/700
See application file for complete search history.

(56) References Cited

U.S. PATENT DOCUMENTS

| | | | | |
|---|---|---|---|---|
| 5,467,464 A | * | 11/1995 | Oprescu et al. | 713/400 |
| 6,236,696 B1 | * | 5/2001 | Aoki et al. | 375/376 |
| 6,278,755 B1 | * | 8/2001 | Baba et al. | 375/360 |
| 6,472,913 B1 | * | 10/2002 | Natsume | 327/144 |
| 6,621,312 B1 | * | 9/2003 | Bassett et al. | 327/156 |
| 6,680,989 B1 | * | 1/2004 | Asada | 375/371 |
| 6,907,096 B1 | * | 6/2005 | Lueker et al. | 375/355 |
| 6,956,921 B1 | * | 10/2005 | Hansson | 375/373 |

* cited by examiner

*Primary Examiner*—Temesghen Ghebretinsae
(74) *Attorney, Agent, or Firm*—Trop, Pruner & Hu, P.C.

(57) ABSTRACT

A technique includes receiving a first signal from a data signal line. The first signal includes an edge that is indicative of a transition between logical states. The first signal is sampled at different times to form a plurality of sampled signals. In response to the sampled signals, the technique includes selecting a subset of the times to sample data from the data signal line.

30 Claims, 9 Drawing Sheets

FIG. 13  0.125UI OPENING
FIG. 14  0.25UI OPENING
FIG. 15  0.5UI OPENING
FIG. 16  0.75UI OPENING
FIG. 17  0.875UI OPENING
FIG. 18  1UI OPENING

DESKEW ARCHITECTURE

BACKGROUND

The invention generally relates to a deskew architecture.

Bits of data typically are communicated over a bus via one or more data signals. In this manner, each data line of the bus communicates a data signal, and different time slices of this data signal indicates different bits of data. The bus typically includes a clock line that communicates a clock signal for purposes of indicating the time positions of the bits in the data signal so that the bits may be recovered from the data signal. The bus may include multiple clock and data lines.

As a more specific example, the clock line typically communicates a periodic clock signal that is used for purposes of indicating the time positions of the different bits of data that has edges that are created by logical state transitions of the clock signal. Each clock edge, in turn, typically is synchronized to a particular time slice (also called a "data eye") of the data signal. In this time slice, the data signal has a logical level indicative of a particular bit of data. Thus, each clock edge is synchronized to a particular bit of data. Therefore, the clock edges typically are used to trigger sampling of the data signal to recover bits of data from a particular data signal.

Ideally, the clock and data signals maintain a predetermined phase relationship as these signals propagate along their respective bus lines. However, non-ideal effects, such as data line skewing and clock jitter, typically alter the phase relationship between the clock and data signals so that at the receiving circuitry, the clock and data signals no longer have a predetermined phase relationship. In a source synchronous clocking scheme, the transmitting circuitry that furnishes the data signal to the bus synchronizes the data and clock signals. Thus, the clock and data signals may have a predetermined phase relationship at the source, i.e., the point where the data signal is furnished to the bus. However, at the receiving circuitry, the edges of the clock signal may have a relatively unpredictable phase relationship with respect to the data signal. Thus, the clock edges cannot be used to trigger sampling of the data signal without realigning or re-synchronizing the clock and data signals.

A bus standard typically defines timing relationships between various signals of a bus. However, the bus standard may assume source synchronous clocking and thus, not define a timing relationship between the data and clock signals at the data receiving circuitry. One such bus standard is the System Packet Interface Level 4 Phase 2 (SPI-4 Phase 2) bus standard specification, such as version 2000.088.4 available from the Optical Internetworking Forum (OIF), located at 39355 California Street, Suite 307, Fremont, Calif. 94538. The SPI-4 Phase 2 bus is a 16-bit wide 400 MHz double data rate telecommunications bus that may be used to exchange packet level information between link and physical layers of a particular network protocol. Because there is no defined relationship between the data and clock signals at the data receiving interface circuitry to this bus, the data lines can be skewed by plus or minus one bit period, and clock jitter adds a fifty percent uncertainty to where the edges of the clock signals occur relative to the data signal.

Thus, there is a continuing need for an arrangement and/or technique to address one or more of the problems that are stated above as well as possibly address other problems not set forth above.

DETAILED DESCRIPTION

Figure 1:
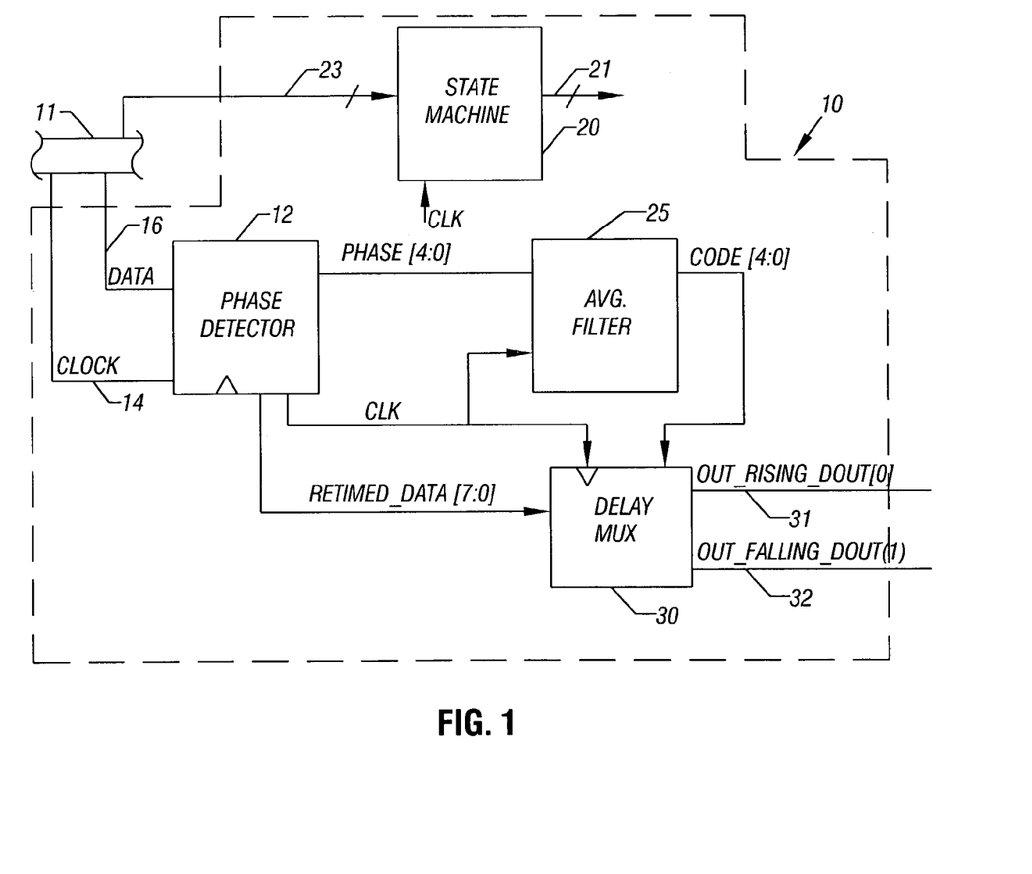
FIG. 1 is a schematic diagram of a deskew circuit according to an embodiment of the invention.

Referring to FIG. 1, an embodiment 10 of a deskew circuit in accordance with the invention may be used in data receiving circuitry of a bus interface to recover bits of data from a particular data line 16 of a bus 11. The deskew circuit 10 effectively retimes a phase relationship between a DATA signal (received from a data line 16 of the bus 11) and a CLOCK signal (received from a clock line 14 of the bus 11). More specifically, in some embodiments of the invention, both the rising and falling edges of the CLOCK signal are associated with different bits of the DATA signal. A predefined relationship is not assumed to exist between the DATA and CLOCK signals at the point (along the bus 11) at which the deskew circuit 10 is located.

The phase relationship between the CLOCK and DATA signals may be defined at the point (along the bus 11) at which the transmitting circuitry furnishes the DATA signal to the bus 11. However, due to clock jitter, skewing and possibly other effects, the phase relationship is assumed to be altered at the deskew circuit 10, which constitutes part of the data receiving circuitry. Therefore, the edges of the CLOCK signal may not be used to directly trigger sampling of the DATA signal for purposes of recovering bits of data from the DATA signal.

However, the deskew circuit 10 effectively realigns the DATA and CLOCK signals by sampling the DATA signal at uniformly spaced, sub-period intervals. For example, in some embodiments of the invention, the deskew circuit 10 samples the DATA signal eight times during each period of the CLOCK signal. The language "unit interval" (abbreviated "UI") is used herein to refer to a unit of time equal to one half of the period of the CLOCK signal. Thus, the period of the CLOCK signal is 2 UI. Therefore, for embodiments of the invention in which the deskew circuit 10 samples the DATA signal eight times for every period of the CLOCK signal, the sampling times are located apart by 0.25 UI. The sampling times have predefined phases with respect to the edges of the CLOCK signal so that the sampling times occur at the same relative times within each period of the CLOCK signal.

The deskew circuit 10 selects the optimum sampling times to recover bits of data from the DATA signal. In this manner, for embodiments of the invention in which one edge (a rising edge, for example) per CLOCK period is associated with a data bit, the deskew circuit 10 selects one of the eight sampling times. Therefore, the level of the DATA signal at this sampling time in every CLOCK period establishes the bit recovered during that CLOCK period.

For embodiments of the invention in which each edge of the CLOCK signal is associated with a data bit (in a double data rate (DDR) clocking scheme, for example), the deskew circuit 10 selects two of the eight sampling times for each CLOCK period. Therefore, the levels of the DATA signal sampled at the same selected two times during each CLOCK period establish the two bits of data recovered during that CLOCK period.

It is assumed herein for purposes of simplifying the following discussion that both the rising and falling edges of the CLOCK signal are associated with different bits of data of the DATA signal (i.e., it is assumed a DDR clocking scheme is used). It is understood that the appended claims cover other embodiments, such as embodiments in which the falling edges and not the rising edges are associated with data bits, for example; and the appended claims cover embodiments in which the rising edges and not the falling edges are associated with the data bits, for example. Thus, other variations are possible and fall within the scope of the appended claims.

As a more specific example, in some embodiments of the invention, the bus 11 may comply with the SPI-4 Phase 2 bus standard. Thus, the data 16 and clock 14 lines may be lines of such a bus, in some embodiments of the invention. It is noted that the bus 11 may include other data and clock lines than just the data 16 and clock 14 lines that are depicted in FIG. 1, in some embodiments of the invention. Therefore, in these embodiments of the invention, part of the deskew circuit 10 may be replicated for each data line, as described further below. The single data line 16 and single clock line 14 are described herein for purposes of simplifying the discussion of the operation of the deskew circuit 10, although it is understood that similar circuitry may be used to compensate for skew in other data lines, in some embodiments of the invention.

In some embodiments of the invention, the deskew circuit 10 selects the optimum sampling times during a training cycle of the bus 11. In this manner, training cycles may be frequently communicated over the bus 11 for purposes of calibrating the deskew circuit 10 as well as for purposes of calibrating other such deskew circuits that are associated with other data lines of the bus 11. The beginning and ending of each training cycle are indicated by predetermined signals that appear on the bus 11.

During the training cycle, at least one rising edge and at least one falling edge are communicated over each data line (such as the data line 16, for example) of the bus 11, in some embodiments of the invention. In some embodiments of the invention, multiple rising and falling edges may be committed over the data line 16 during the training cycle.

In response to the training cycle, the deskew circuit 10 calibrates its selection of sampling times for recovering bits of data from the DATA signal. Thus, between training cycles, the deskew circuit 10 uses the calibrated times established from the latest training cycle to recover bits of data from the DATA signal.

Turning now to a more specific discussion of the deskew circuit 10, in some embodiments of the invention, the deskew circuit 10 includes a phase detector 12. For each CLOCK period, the phase detector 12 samples the DATA signal at eight sampling times. These sampling times, in turn, are established by clock signals that are synchronized to the CLOCK signal. In this manner, these clock signals have the same period of the CLOCK signal but are shifted in time relative to the CLOCK signal, thereby giving each of these clock signals a different phase.

Figure 10:
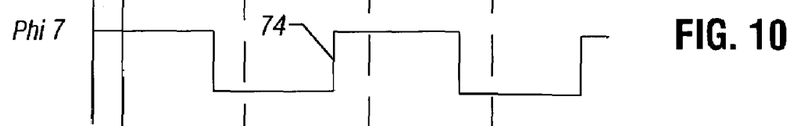

As a more specific example, FIGS. 3–10 depicts an exemplary set of eight such clock signals, labeled Phi0 (FIG. 3), Phi1 (FIG. 4), Phi2 (FIG. 5), Phi3 (FIG. 6), Phi4 (FIG. 7), Phi5 (FIG. 8), Phi6 (FIG. 9) and Phi7 (FIG. 10). As shown in FIGS. 3–10, each one of the Phi0–7 clock signals is time shifted with respect to another one of the Phi0–7 clock signals by 0.25 UI. Thus, for this example, each of the Phi0–7 clock signals has a period of 2 UI. One of the Phi0–7 clock signals (such as the Phi0 signal, as an example) may be in phase with the CLOCK signal, in some embodiments of the invention.

In some embodiments of the invention, the rising edges of the Phi0–7 clock signals trigger the sampling of the DATA signal. Thus, for each period of the CLOCK signal, the Phi0–7 clock signals have eight rising edges, and in response to these eight rising edges, the phase detector 12 obtains eight samples of the DATA signal. This 2 UI interval over which the eight samples are taken is referred to as a window 69 of sampling (see FIGS. 3–10).

In some embodiments of the invention, the phase detector 12 oversamples the input data by a factor of four, and thus uses four windows 69 of sampling. With this arrangement, three-fourths of the data is immediately discarded, thus minimizing the area and clock speed penalties that are normally associated with an oversampling approach. Thus, the architecture described herein has the benefits of access to oversampled data without the penalties of storing it.

Figure 3:
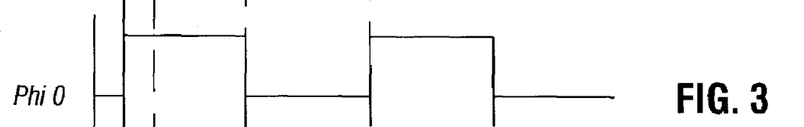
FIGS. 3–10 are waveforms depicting clock signals used by the phase detector of FIG. 2 according to an embodiment of the invention.

Referring to FIG. 1, the phase detector 12 furnishes eight signals called RETIMED_DATA[7:0] that each indicate a different sampled value of the DATA signal obtained over the 2 UI window 69 of sampling. The phase detector 12 synchronizes updates of the RETIMED_DATA[7:0] signals with a clock signal (called "CLK"), in some embodiments of the invention. As an example, in some embodiments of the invention, the CLK signal may be the Phi0 clock signal (FIG. 3).

In addition to the RETIMED_DATA[7:0] signals, in some embodiments of the invention, the phase detector 12 furnishes a phase code. The phase code generally indicates the two optimum sampling times for recovering bits of data from the DATA signal during each CLOCK period. More specifically, the phase code generally indicates which one of the RETIMED_DATA[7:0] signals to select to obtain a bit associated with a rising edge of the CLOCK signal, and the phase code generally indicates which one of the RETIMED_ DATA[7:0] signals to select to obtain a bit associated with the falling edge of the CLOCK signal.

The phase code remains constant during non-training cycles of the bus 11. However, the phase detector 12 recalibrates the phase code during each training cycle. This recalibration is described further below.

In some embodiments of the invention, the phase code takes the form of a five bit digital code called PHASE[4:0]. As described below, for purposes of reducing random errors in the PHASE[4:0] code, in some embodiments of the invention, the deskew circuit 10 includes an averaging filter 25 that performs a rolling average of phase codes to produce an average five bit digital phase code called CODE[4:0]. Thus, in some embodiments of the invention, the averaging filter 25 is activated during each training cycle to update the CODE[4:0] code.

In response to the phase code (provided by either the PHASE[4:0] code or the CODE[4:0] code, depending on the particular embodiment of the invention), a delay multiplexing circuit 30 (of the deskew circuit 10) selects two of the RETIMED_DATA[7:0] signals: one of the selected signals appears as a signal (or bit) called OUT_RISING_DOUT[0] on an output terminal 31 of the circuit 30, and another one of the selected signals appears as a signal (or bit) called OUT_FALLING DOUT[1] on an output terminal 32 of the circuit 30. As their names imply, the OUT_RISING_DOUT [0] signal indicates a bit of data associated with a rising edge of the CLOCK signal, and the OUT_FALLING_DOUT[1] signal indicates a bit of data associated with a falling edge of the CLOCK signal. The delay multiplexing circuit 30 updates the OUT_RISING_DOUT[0] and OUT_FALLING_DOUT[1] signals (or bits) on every cycle of the CLK clock signal.

Among the other features of the deskew circuit 10, in some embodiments of the invention, the deskew circuit 10 includes a state machine 20 that, among its other functions, detects training cycles on the bus 11; and initializes and controls the components of the deskew circuit 10 during each training cycle to recalibrate the phase code. To perform its functions, the state machine 20 includes various input terminals 23 and output terminals 21. Operation of the state machine 20 is described in more detail below.

Thus, to summarize, in some embodiments of the invention, the deskew circuit 10 performs the following functions during a training cycle of the bus 11. The deskew circuit 10 receives the DATA signal from the data signal line 16, and the DATA signal eventually includes at least one edge that is indicative of a transition between logical states. The deskew circuit 10 samples the DATA signal at different times to form a plurality of sampled signals called RETIMED_DATA[7:0]. Each of the RETIMED_DATA[7:0] signals, in turn, is associated with a different clock phase. In response to these sampled signals, the deskew circuit 10 selects at least one of the clock phases (and thus selects at least one of the sampling times) to use for sampling bits of data from the data signal line 16.

The advantages of the deskew circuit 10 may include one or more of the following, as compared to conventional deskew circuits. No custom analog design may be needed, and the architecture may be relatively insensitive to layout parasitics. The implementation, in some embodiments of the invention, may be almost all digital in that the only analog block may be a delay locked loop (DLL) or phase locked loop (PLL) block to generate the Phi0–7 clock signals in response to the CLOCK signal. It is also possible to verify the performance of the entire deskew circuit 10 in a digital simulator and simulate it as part of a large digital system. Given an accurate DLL or PLL characterization, digital static timing analysis may be used to verify all the timing paths. The digital nature of the design may permit a smaller geometry without analog simulation and layout rework. Other and different advantages may be present in other embodiments of the invention.

Figure 2:
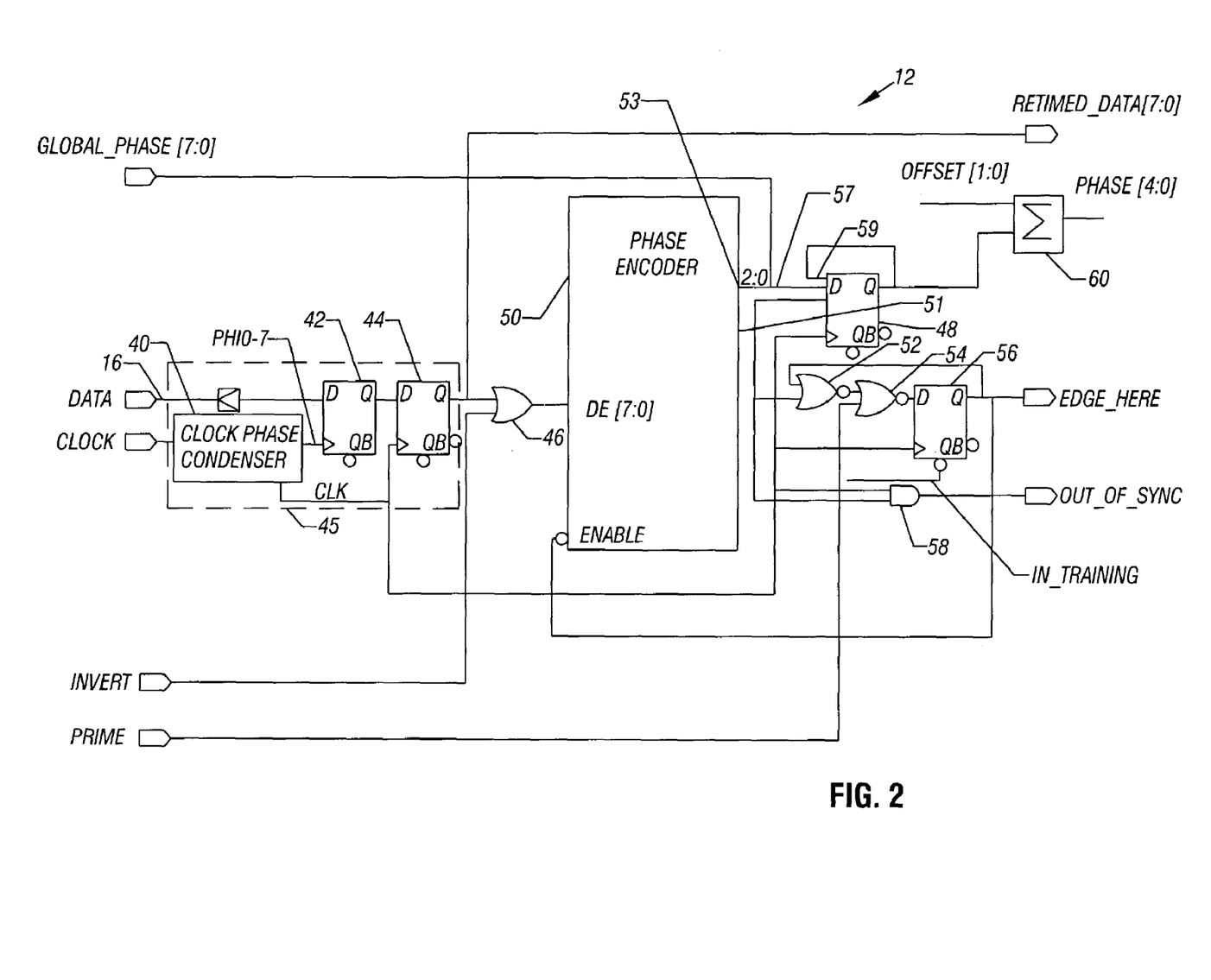
FIG. 2 is a schematic diagram of a phase detector of the deskew circuit of FIG. 1 according to an embodiment of the invention.

FIG. 2 depicts a schematic diagram of the phase detector 12 in accordance with some embodiments of the invention. The phase detector 12 includes a sampling circuit 45 that produces the RETIMED_DATA[7:0] signals. This sampling circuit 45 includes a clock phase generator 40, such as a delay locked loop (DLL) or phase locked loop (PLL) circuit, to generate the eight Phi0–7 clock signals (see FIGS. 3–10) in response to the CLOCK signal. The Phi0–7 clock signals are received by eight clock input terminals of an eight bit, D-type flip-flop 42 of the sampling circuit 45.

The flip-flop 42 performs the sampling of the DATA signal to obtain eight sampled values per CLOCK period. More specifically, each of the eight data input terminals of the flip-flop 42 is associated with a different one of the Phi0–7 clock signals and is associated with a different output terminal of the flip-flop 42. In some embodiments of the invention, the flip-flop 42 is triggered in response to rising clock edges. Therefore, in some embodiments of the invention, a sampled value of the DATA signal appears on one of the output terminals of the flip-flop 42 on every occurrence of a positive edge on the Phi0–7 signals. Thus, during the 2 UI window 69 (see FIGS. 3–10) of sampling, a different output terminal of the flip-flop 42 is updated with a sampled value of the DATA signal every 0.25 UI. Therefore, at the end of a particular window 69 of sampling, eight sampled values of the DATA signal appear on the eight output terminals of the flip-flop 42.

The sampling circuit 45 also includes an eight bit, D-type flip-flop 44 to retime the sampled values to the same clock phase. The flip-flop 44 has eight input terminals that are coupled to the corresponding eight output terminals of the flip-flop 42, and the flip-flop 44 has eight output terminals that collectively furnish the RETIMED_DATA[7:0] signals. The flip-flop 44 has a single clock input terminal that is coupled to the CLK signal. Due to this arrangement, the flip-flop 44 updates the RETIMED_DATA[7:0] signals on every cycle of the CLK signal. For example, in some embodiments of the invention, the flip-flop 44 updates the RETIMED_DATA[7:0] signals in response to rising edges of the CLK signal.

For purposes of generating the three least significant bits of the PHASE[4:0] code, the phase detector 12 includes a phase encoder 50. In some embodiments of the invention, the phase encoder 50 is formed from combinatorial logic. The phase encoder 50 is coupled to eight output terminals of an multiple bit exclusive OR (XOR) gate 46 that is used in a training cycle to invert the logical states of the RETIMED_DATA[7:0] signals for purposes of determining the time location of a falling edge, as described below. The XOR gate 46 includes eight input terminals that receive the RETIMED_DATA[7:0] signals.

Another input terminal of the XOR gate 46 receives a signal called INVERT. In response to the INVERT signal being de-asserted (driven low, for example), the XOR gate 46 furnishes signals indicative of the non-inverted RETIMED_DATA[7:0] signals to the input terminals of the phase encoder 50. In response to the INVERT signal being asserted (driven high, for example), the XOR gate 46 furnishes signals indicative of the inverted RETIMED_DATA[7:0] signals to the input terminals of the phase encoder 50. The INVERT signal remains de-asserted during non-training cycles and is selectively asserted by the state machine 20 (FIG. 1) during training cycles, as described further below.

In some embodiments of the invention, the phase encoder 50 furnishes a three bit digital code (called PHASECODE[2:0]). The bits of the PHASECODE[2:0] code appear on three output terminals 53 of the encoder 50 and are used by other circuitry of the phase detector 12 to generate the PHASE[4:0] code, as described below.

Figure 11:
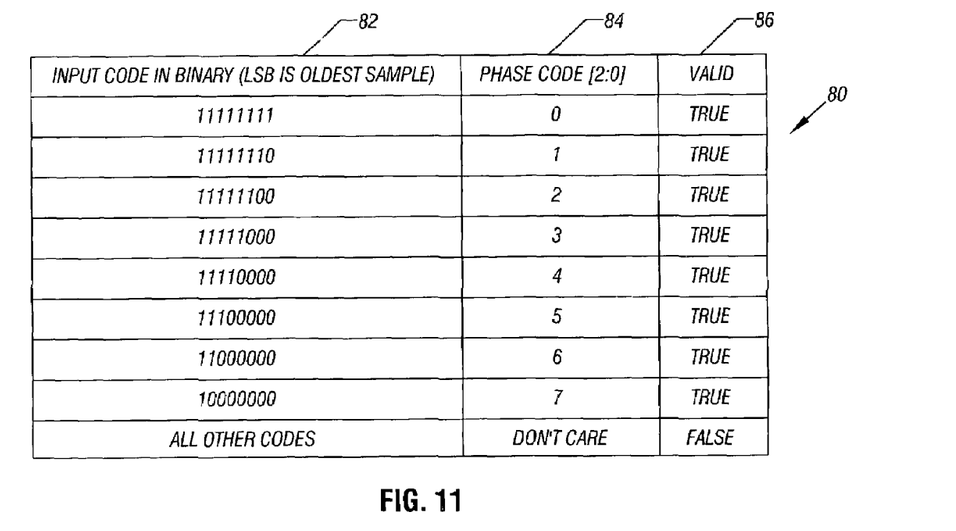
FIG. 11 depicts a table illustrating codes generated by a phase encoder of the phase detector of FIG. 2 according to an embodiment of the invention.

During a training cycle, the PHASECODE[2:0] code indicates the location of an edge in the DATA signal within the window of sampling. In this manner, FIG. 11 depicts a table 80, in accordance with at least one embodiment of the invention, showing the relationship between the bits on the input terminals of the phase encoder 50 and the PHASECODE[2:0] code. More specifically, one column 84 of the table 80 depicts PHASECODE[2:0] codes for different input bit combinations that are depicted in column 82 of the table 80. These bit combinations appear on the input terminals of the phase encoder 50 and are furnished by the output terminals of the XOR gate 46. Column 86 of the table 80 depicts the logical state of another output terminal 51 (of the phase encoder 50). The output terminal 51 indicates a TRUE state (a logic one level, for example) when the PHASECODE[2:0] is valid and indicates a FALSE state (a logic zero level, for example) when the PHASECODE[2:0] is invalid.

The bit combinations in the column 82 are either the RETIMED_DATA[7:0] signals or the inverted versions of these signals, depending on whether the INVERT signal is asserted or de-asserted. The bits for each combination are ordered with respect to time, with the least significant bit (LSB) of each combination being indicative of the oldest sampled value (i.e., the sample taken in response to the Phi0 clock signal, for example) and the most significant bit (MSB) of each combination being indicative of the most recent sampled value (i.e., the sample taken in response to the Phi7 clock signal, for example).

Thus, as an example, assuming the INVERT signal is de-asserted, the bit combination "11111100b" (wherein the suffix "b" indicates a binary representation) indicates a rising edge in the DATA signal somewhere in the window of sampling between the occurrence of the rising edge of the Phi1 clock signal and the rising edge of the Phi2 clock signal. As another example, assuming the INVERT signal is asserted, the bit combination "11000000b" (wherein the suffix "b" indicates a binary representation) indicates a falling edge in the DATA signal somewhere in the window of sampling between the occurrence of the rising edge of the Phi5 clock signal and the rising edge of the Phi6 clock signal.

In response to the PHASECODE[2:0] code becoming invalid, circuitry of the phase detector 12 latches the last valid PHASECODE[2:0] code. In this manner, in some embodiments of the invention, the phase detector 12 includes a latch 48 that includes five data input terminals 57: three input terminals to receive the PHASECODE[2:0] code from the output terminals 53 of the phase encoder 50; and two input terminals to receive bit values from a digital signal called GLOBAL_PHASE[1:0]. The GLOBAL_PHASE[1:0] digital signal contains bits that control global phase measurement between similar deskew circuits 10 as described below. The two bits of the GLOBAL_PHASE[1:0] signal form the two most significant bits of the input terminals 57. The PHASECODE[2:0] bits form the three least significant bits of the input terminals 57.

Another set of five data input terminals 59 of the latch 48 are coupled to the five output terminals of the latch 48. The latch 48 is clocked by the CLK clock signal. The latch 48 includes a selection input terminal that is coupled to the output terminal 51. Due to this arrangement, in response to the output terminal 51 indicating a valid PHASECODE[2:0] code, the latch 48 selects the input terminals 59 to communicate the PHASECODE[2:0] code to the output terminals of the latch 48 on each rising edge of the CLK clock signal. However, in response to the output terminal 51 indicating an invalid PHASECODE[2:0] code, the latch 48 selects the input terminals 57 so that a valid PHASECODE[2:0] code is latched and retained in response to subsequent rising edges of the CLK clock signal.

The PHASECODE[2:0] code specifically indicates the location of the edges of the data eyes or data times slices of the DATA signal. Thus, the PHASECODE[2:0] provides an indication of where not to sample the DATA signal. Therefore, in some embodiments of the invention, for purposes of indicating which pair of Phi0–7 clock signals to use for sampling, the phase detector 12 includes an adder 60 to add a fixed offset to the PHASECODE[2:0] code.

In this manner, the fixed offset is indicated by a two bit digital signal called OFFSET[1:0] and may be equivalent to adding 0.25 UI, 0.5 UI or 0.75 UI (as just a few examples) to the time indicated by the PHASE[2:0] code. This additional offset, ideally centers the sampling time within the data eye. The adder 60 adds the five bit output of the latch 48 to the OFFSET[1:0] code to produce the five bit PHASE[4:0] code. Thus, due to this arrangement, the PHASE[4:0] code indicates the pair of Phi0–7 clock signals (and thus, the pair of associated sampling times) to use for sampling the DATA signal.

Figure 13:
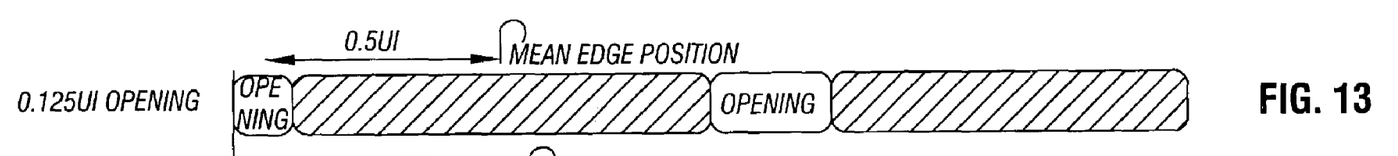
FIGS. 13–18 are waveforms of data signals having different data eye widths.
Figure 14:
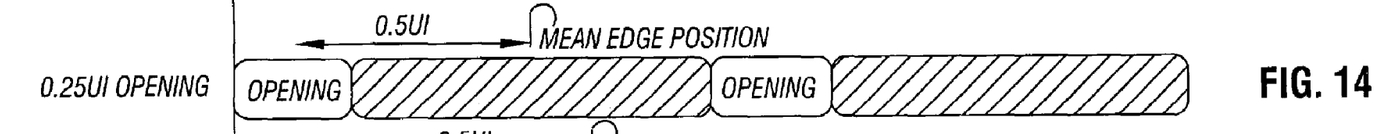
Figure 15:
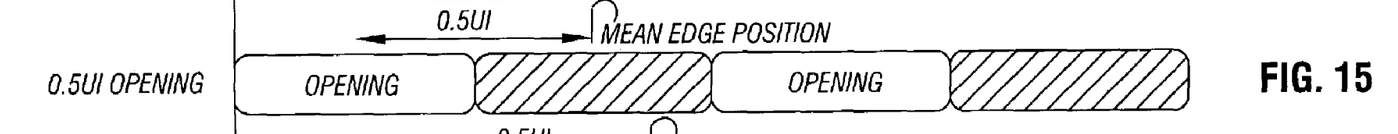
Figure 16:
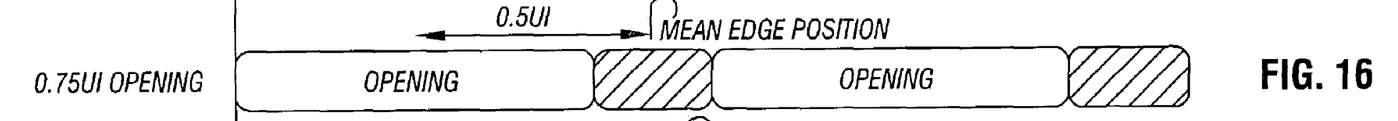
Figure 17:
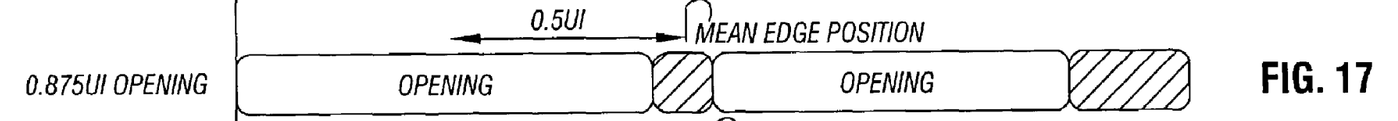
Figure 18:
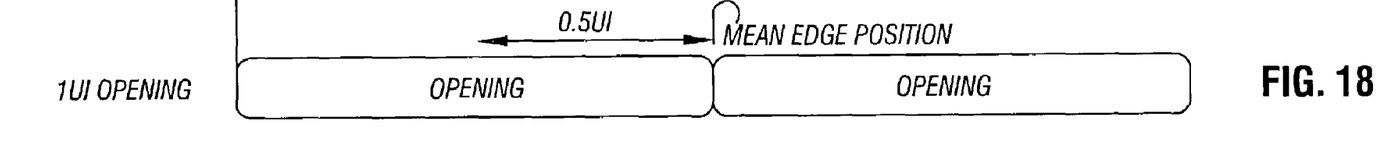

Thus, the aim of the above-described sampling time selection scheme is to ensure that samples occur in the center of the eye opening of a data bit—the region during which no edges occur. This scheme is based on the premise that the center of the eye opening of a particular data bit is always 0.5 UI away from the mean edge position. The validity of this assumption is illustrated in FIGS. 13–18. In this manner, FIG. 13 depicts a 0.125 UI data eye opening; FIG. 14 depicts a 0.25 UI data eye opening; FIG. 15 depicts a 0.5 UI data eye opening; FIG. 16 depicts a 0.75 UI data eye opening; FIG. 17 depicts a 0.875 UI data eye opening; and FIG. 18 depicts a 1 UI data eye opening. As can be seen from these figures, the center of the data eye opening is ideally always 0.5 UI away from the mean edge position. Thus, by averaging (via the averaging filter 25 (FIG. 1)) the results obtained by detecting the rising and falling edges and adding an offset (via the adder 60 (FIG. 2)) of 0.5 UI, the selected sampling times should fall with the centers of the data eyes.

However, a fixed offset of 0.5 UI could be susceptible to the fact that the training pattern is somewhat non-typical. The mean edge position of the training pattern is likely to be different from normal data. This is because deterministic edge jitter is partly dependent on how long the input has been in a quiescent state prior to the edge. One extreme is an edge which has been high for only 1 UI, and the other extreme is an edge following an effectively infinite period of inactivity. General data is likely to be closer to the former, but having been high for 10 UI, the training pattern is likely to be much closer to the latter. It is not possible to predict the magnitude of this difference, since it depends on application specific factors, such as the length of a printed circuit board (PCB) conductive trace, for example. To reduce this risk, the offset from the mean edge position to the sampling point may be made programmable in some embodiments of the invention via a register over a range of 1 UI in steps of 0.125 UI.

Among the other features of the phase detector 12, in some embodiments of the invention, the detector 12 includes a D-type flip-flop 56 that provides a signal called EDGE_HERE for purposes of selectively enabling operation of the phase encoder 50. The EDGE_HERE signal is received by an inverting enable input of the phase encoder 50. The asserted state of the EDGE_HERE signal indicates that the phase encoder 50 has detected an edge in DATA signal, and this asserted state of the EDGE_HERE signal disables the phase encoder 50. This disabling of the phase encoder 50 ensures that metastability issues cannot cause the phase encoder 50 to detect the same edge twice and also copes with the ambiguity of the RETIMED_DATA[7:0] signals being all logical "1"s, which could be the end of a training pattern or an edge that occurred just before the rising edge of the CLK clock signal.

The circuit to assert/de-assert the EDGE_HERE signal includes a NOR gate 52. One input terminal of the NOR gate 52 is coupled to the output terminal 51 of the phase encoder 50, and the other input terminal of the NOR gate 52 is coupled to the output terminal of the flip-flop 56. The output terminal of the NOR gate 52, in turn, is coupled to an input terminal of another NOR gate 54. Another input terminal of the NOR gate 54 is coupled to receive a signal called PRIME. The output terminal of the NOR gate 54 is coupled to the data input terminal of the flip-flop 56.

As its name implies, the PRIME signal is used for purposes of priming the circuitry of the phase detector 12 to detect another edge and is controlled by the state machine 20 (FIG. 1) of the deskew circuit 10, in some embodiments of the invention. More specifically, the PRIME signal is asserted (driven high, for example) to cause the EDGE_HERE signal to be de-asserted on the next rising edge of the CLK signal. The de-asserted state of the EDGE_HERE signal, in turn, enables the phase encoder 50 to detect an edge. After its assertion, the PRIME signal is de-asserted so that the EDGE_HERE signal may be asserted on detection of an edge.

More particularly, in response to the assertion of the output terminal 51 to indicate a valid PHASECODE[2:0] code, a logic one state appears on the data input terminal of the flip-flop 56. Therefore, the flip-flop 56 asserts the EDGE_HERE signal to indicate detection of an edge on the next rising edge of the CLK signal in response to the phase encoder 50 indicating detection of the edge. As stated above, the assertion of the EDGE_HERE signal disables the phase encoder 50 under the PRIME signal is subsequently re-asserted to prime the phase detector 12 to detect the next edge.

The flip-flop 56 receives a signal called IN_TRAINING at its inverted clear terminal. The IN_TRAINING signal is provided by the state machine 20 (FIG. 1). The state machine 20 asserts (drives high, for example) the IN_TRAINING signal upon detection of a training cycle. At the conclusion of the training cycle, the state machine 20 de-asserts (drives low, for example) the IN_TRAINING signal. In response to the IN_TRAINING signal being de-asserted, the flip-flop 56 de-asserts the EDGE_HERE signal. In response to the IN_TRAINING signal being asserted, the flip-flop 56 responds to the value on its data input terminal to assert/de-assert the EDGE_HERE signal. Thus, the IN_TRAINING signal ensures that the EDGE_HERE signal is de-asserted at the beginning of the training cycle.

The phase detector 12 also provides a signal called OUT_OF_SYNC. The OUT_OF_SYNC signal is used to reset the state machine 20 (FIG. 1) if an edge appears in the DATA signal during the priming cycle, as such an edge is outside of the four cycle window during which the GLOBAL_PHASE[1:0] code is valid. The OUT_OF_SYNC signal is provided by the output terminal of an AND gate 58. One input terminal of the AND gate 58 receives the CLK signal, and another input terminal of the AND gate is coupled to the output terminal 51 of the phase encoder 50.

Figure 12:
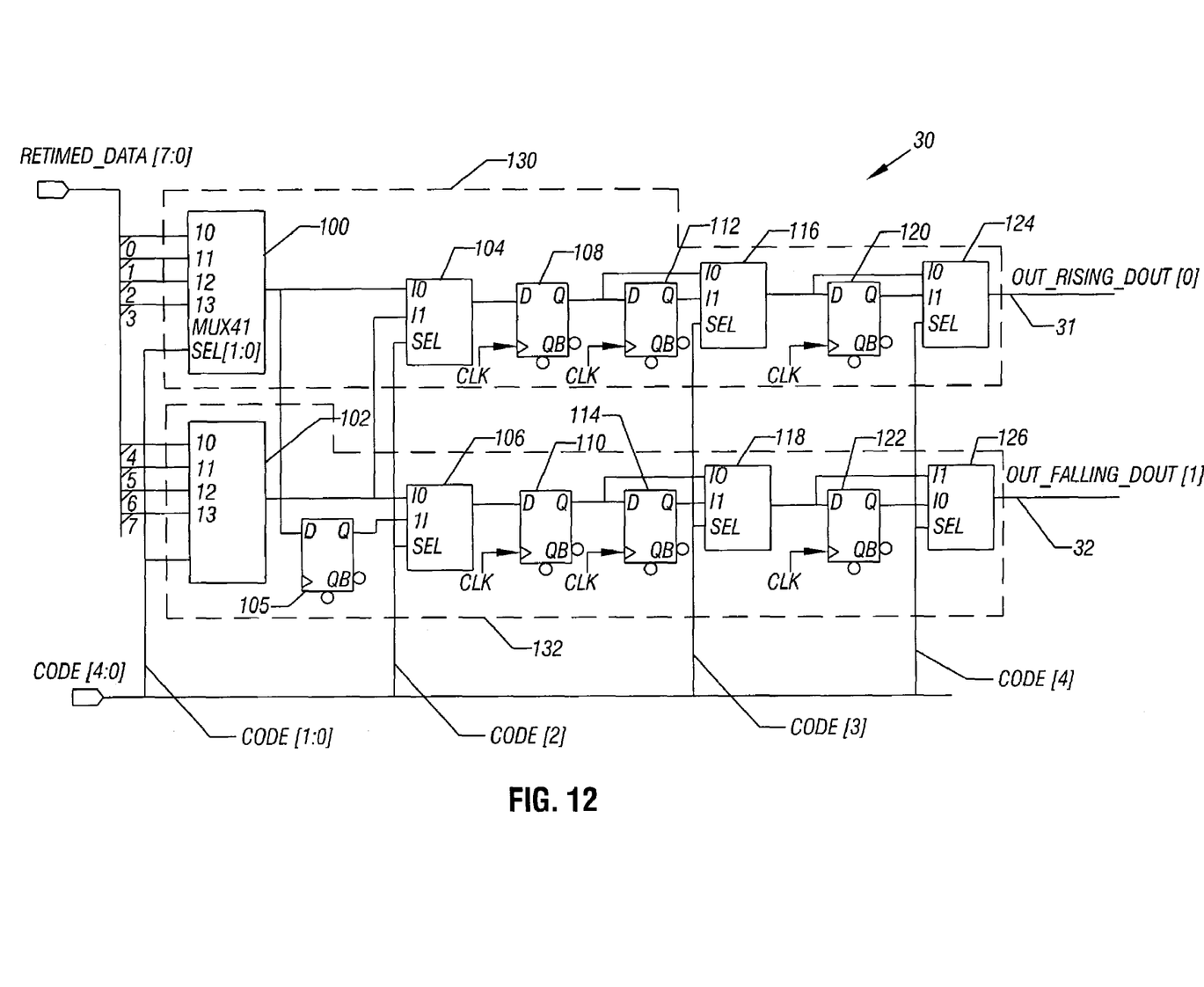
FIG. 12 is a schematic diagram of a delay multiplexing circuit of the deskew circuit of FIG. 1 according to an embodiment of the invention.

Referring to FIG. 12, in some embodiments of the invention, the multiplexing delay circuit 30 includes two data paths: a first data path 130 to produce the OUT_RISING_DOUT[0] signal, the signal indicative of the recovered bit that is associated with the rising edge of the CLOCK signal; and a second data path 132 to produce the OUT_FALLING_DOUT[1] signal, the signal indicative of the recovered bit associated with the falling edge of the CLOCK signal. The multiplexing delay circuit 30 is further arranged in stages, with each stage forming parts of both data paths 130 and 132.

The first stage of the multiplexing delay circuit 30 is formed from two multiplexers 100 and 102. This stage is controlled by the two least significant bits (i.e., bits 1:0) of the CODE[4:0] code, as these bits are received by the two selection input terminals of each multiplexer 100, 102. These two bits effectively select the two of the eight Phi0–7 clock signals that are used to sample the DATA signal. More specifically, the multiplexer 100 includes four data input terminals that receive the RETIMED_DATA[3:0] signals, and the four data input terminals of the multiplexer 102 receive the RETIMED_DATA[7:4] signals. Thus, the multiplexer 100 effectively selects one of the Phi0–3 clock signals for sampling, and the multiplexer 102 effectively selects one of the Phi4–7 clock signals for sampling. The selected clock signals are located 1 UI or one half of the clock period apart, in some embodiments of the invention. This means that the two selected Phi0–7 clock signals are complements of each other.

As an example, if the CODE[1:0] bits are "10b," then the Phi2 and Phi6 clock signals are effectively selected for the sampled data valves. This means that the multiplexer 100 selects the RETIMED_DATA[2] signal, the sampled value obtained via the Phi2 clock signal, and the multiplexer 102 selects the RETIMED_DATA[6] signal, the sampled value obtained via the Phi6 clock signal.

The two rising edges of the two Phi0–7 clock signals that serve as the sampling points of the DATA signal may not fall within the same window 69 of sampling. For example, referring also to FIGS. 3–10, in a given window 69a of sampling, the phase detector 12 obtains eight samples of the DATA signal that corresponds to a set of RETIMED_DATA[7:0] signals. If the optimum sampling time for sampling a bit associated with a rising edge of the CLOCK signal is within the first half 70 of the sampling window 69a, then the optimum sampling time for sampling the next bit (in time) that is associated with the falling edge of the CLOCK signal is within the second half 71 of the sampling window 69a. Thus, one set of RETIMED_DATA[7:0] signals is to recover the two bits that are indicated by the OUT_RISING_DOUT[0] and OUT_DOUT[1] signals associated with rising and falling edges of the CLOCK signal.

For example, the rising edge 72 of the Phi3 clock signal (FIG. 6) falls within the first half 70 of the sampling window 69a. If the rising edge 72 of the Phi3 clock signal is the optimum time to sample a bit that is associated with a rising edge of the CLOCK signal, then the rising edge 74 of the Phi7 clock signal (FIG. 10) is the optimum time to sample the next bit in time, a bit associated with a falling edge of the CLOCK signal. As depicted in FIG. 10, the rising edge 74 falls within the second half 71 of the sampling window 69a. Therefore, for this example, one set of RETIMED_DATA[7:0] signals provides the two OUT_RISING_DOUT[0] and OUT_FALLING_DOUT[1] bits: a first bit associated with a rising edge of the CLOCK signal and a second bit that is preceded by the first bit in time and is associated with a falling edge of the CLOCK signal.

However, for some sampling times, two sets of RETIMED_DATA[7:0] signals may be needed to recover a first bit of data that is associated with a rising edge of the CLOCK signal and a second bit of data that is preceded by the first bit in time and is associated with a falling edge of the CLOCK signal. For this scenario, sampling times for two bits associated with rising and falling edges of the CLOCK signal still fall within a single window 69. Within each window 69, a bit that is associated with a falling edge of the CLOCK signal is sampled before a bit that is associated with a rising edge of the CLOCK signal. The recovered bits (i.e., the bits indicated by the OUT_RISING DOUT[0] and OUT_FALLING_DOUT[1] signals) that are provided by the output terminals 31 and 32 of the delay multiplexing circuit 30 assume a specific time ordering: the bit that is associated with the rising edge of the CLOCK signal (i.e., the bit that is indicated by the OUT_RISING_DOUT[0] signal) is received by the deskew circuit 10 before the bit that is associated with the falling edge of the CLOCK signal (i.e., the bit that is indicated by the OUT_FALLING_DOUT [1] signal). Thus, if the assumed time ordering is reversed by the selection of the Phi0–7 clock signals, the delay multiplexing circuit 30 performs the appropriate post sampling time compensation to restore the proper ordering of the bits, as described below.

If one of the Phi4–7 clock signals is used to sample the bit associated with the rising edge of the CLOCK signal, then compensation by the delay multiplexing circuit 30 to restore the proper time ordering of the sampled bits is required. As a more specific example, example, the rising edge 76 of the Phi5 clock signal (FIG. 8) falls within the second half 71 of the sampling window 69*a*. If the rising edge 76 is the optimum time to sample a bit (indicated by the DATA signal) that is associated with a rising edge of the CLOCK signal, then the rising edge 77 of the Phi1 clock signal (FIG. 4) is the optimum time to sample the next bit in time, a bit associated with a falling edge of the CLOCK signal.

Figure 4:
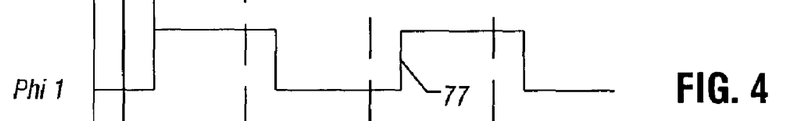
Figure 5:
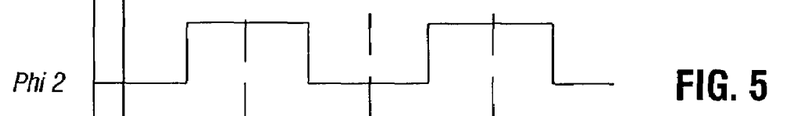
Figure 6:
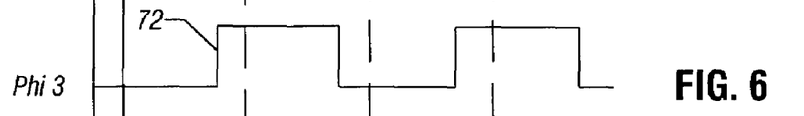
Figure 7:
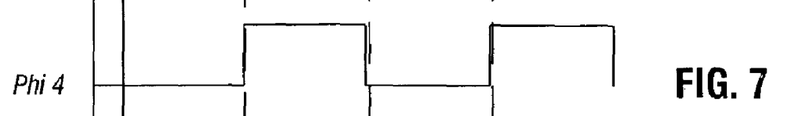
Figure 8:
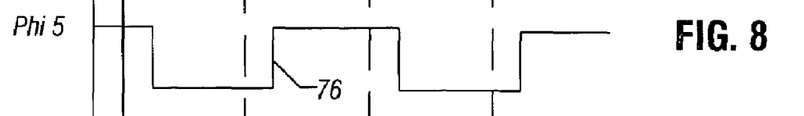
Figure 9:
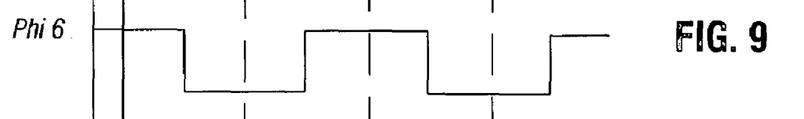

As depicted in FIG. 4, however, the rising edge 77 falls within the first half 70 of the next sampling window 69*b* in time. Therefore, for this example, two sets of RETIMED_DATA[7:0] signals that are associated with two different sampling windows 69*a* and 69*b* provide the two bits: a first bit associated with a rising edge of the CLOCK signal and a second bit that is preceded by the first bit in time and is associated with a falling edge of the CLOCK signal.

In response to the above-described scenario in which the sampling time for the bit associated with the rising edge of the CLOCK signal appears in the second half 71 of the window 69, the delay multiplexing circuit 30 performs the following compensation in some embodiments of the invention. The circuit 30 introduces a one CLOCK period delay to the bit indicated by the output terminal of the multiplexer 100 and reverses the routing from the output terminals of the multiplexers 100 and 102 so that the bit furnished by the multiplexer 100 is routed to the data path 132 and the bit furnished by the multiplexer 102 is routed to the data path 130. Otherwise, for the scenario in which the sampling time for the bit associated with the rising edge of the CLOCK signal appears in the first half 70 of the window 69, the delay multiplexing circuit 30 routes the bit furnished by the multiplexer 100 to the data path 130 without adding further delay and routes the bit furnished by the multiplexer 102 to the data path 130 without adding further delay.

The above-described routing occurs in a second stage of the delay multiplexing circuit 30. The second stage includes a multiplexer 104 that is associated with the OUT_RISING_DOUT[0] bit data path 130 and a multiplexer 106 that is associated with the OUT_FALLING_DOUT[1] bit data path 132. An input terminal of the multiplexer 104 is coupled to the output terminal of the multiplexer 100, and another input terminal of the multiplexer 104 is coupled to the output terminal of the multiplexer 102.

The selection input of the multiplexer 104 is coupled to receive the CODE[2] bit, a bit that indicates whether the sampling time for the bit associated with the rising edge of the CLOCK signal falls within the first half 70 or the second half 71 of the sampling window 69. In this manner, in some embodiments of the invention, a CODE[2] bit of "1" indicates that the sampling time for the bit that is associated with the rising edge of the CLOCK signal falls within the second half 71 of the sampling window 69, thereby requiring the delay and re-rerouting described above. Conversely, a CODE[2] bit of "0" indicates that the sampling time for the bit that is associated with the rising edge of the CLOCK signal falls within the first half 70 of the sampling window 69.

To introduce the one CLOCK period delay, the second stage includes a D-type flip-flop 105 that has its data input terminal connected to the output terminal of the multiplexer 100. The flip-flop 105 is clocked by the CLK signal. The output terminal of the flip-flop 105 is coupled to one input terminal of a multiplexer 106. The other input terminal of the multiplexer 106 is coupled to the output terminal of the multiplexer 102. The selection input of the multiplexer 106 receives the CODE[2] bit.

The third stage of the delay multiplexing circuit 30 is associated with delays that the circuit 30 selectively introduces for purposes of synchronizing the updating of the recovered bits indicated by the circuit 30 with the updating of recovered bits by other deskew circuits (not shown in FIG. 15) that are deskew other data lines of the bus 11. In other words, all deskew circuits update their indicated bits on the same rising edges of the CLK signal, in some embodiments of the invention. The third stage includes D-type flip-flops 108 and 112 and a multiplexer 116 that are collectively associated with the data path 130; and the third stage includes D-type flip-flops 110 and 114 and a multiplexer 118 that are collectively associated with the data path 132.

More specifically, the output terminal of the multiplexer 104 is connected to the input terminal of the flip-flop 108, and the flip-flop 108 is clocked by the CLK clock signal. The output terminal of the flip-flop 108, in turn, is coupled to the data input terminal of the flip-flop 112. The output terminal of the flip-flop 108 is provided to an input terminal of a multiplexer 116, and the output terminal of the flip-flop 112 is provided to another input terminal of the multiplexer 116. The select terminal of the multiplexer 116 receives the CODE[3] bit.

The output terminal of the multiplexer 106 is coupled to the input terminal of the D-type flip-flop 110, and the output terminal of the flip-flop 110 is coupled to the input terminal of another D-type flip-flop 114. Both flip-flops 110 and 114 are clocked by the CLK clock signal. The output terminal of the flip-flop 110 is coupled to an input terminal of a multiplexer 118, and the output terminal of the flip-flop 114 is coupled to another input terminal of the multiplexer 118. The selection input of the multiplexer 118 receives the CODE[3] signal.

Thus, the state of the CODE[3] bit controls whether a one CLOCK period or a two CLOCK period delay is introduced to the recovered bits. The CODE[3] bit may be used as a global control mechanism to synchronize the updating of the recovered bits of the delay multiplexing circuit 30 with the updating of the recovered bits by other multiplexing circuits 30 (not shown) of other deskew circuits 10.

The function of a fourth stage of the delay multiplexing circuit 30 is to selectively delay the appearance of the recovered bits on the output terminals 31 and 32 if an overflow occurs in connection with the addition that is performed by the adder 60 (FIG. 2). In this manner, should an overflow condition arise (as indicated by the CODE[4] bit), the fourth stage introduces a one CLOCK period delay to the propagation of the recovered bits along their respective paths 130 and 132.

More specifically, the fourth stage includes a D-type flip-flop 120 and a multiplexer 124 in the data path 130; and the fourth stage includes a D-type flip-flop 122 and a multiplexer 126 in the data path 132. The output terminal of the multiplexer 116 is coupled to the data input terminal of the D-type flip-flop 120 and is also coupled to an input terminal of the multiplexer 124. The output terminal of the flip-flop 120 is coupled to another input terminal of the multiplexer 124, and the select terminal of the multiplexer 124 is coupled to receive the CODE[4] bit. The flip-flop 120 is clocked by the CLK signal. The output terminal of the multiplexer 124 provides the OUT_FALLING_DOUT[0] signal.

The output terminal of the multiplexer 118 is coupled to the input terminal of the flip-flop 122, and the flip-flop 122 clocked by the CLK clock signal. The input terminal of the flip-flop 122 is coupled to one input terminal of a multiplexer 126, and the output terminal of a flip-flop 122 is coupled to another input terminal of the multiplexer 126. The selection input terminal of the multiplexer 126 is connected to receive the CODE[4] bit, and the output terminal of the multiplexer 126 furnishes the OUT_FALLING_DOUT[1] signal.

Thus, in response to the CODE[4] bit indicating an overflow condition (as an example, the CODE[4] bit may be a "1" bit to indicate this overflow condition), the fourth stage of the delay multiplexing circuit 30 introduces a one CLK period delay in both data paths 130 and 132. Otherwise, in response to the CODE[4] bit not indicating an overflow condition, the fourth stage does add any significant delay.

Thus, in the above-described implementation of the deskew circuit, the retiming flip-flops are shared between the phase detector 12 and the data path (to the delay multiplexing circuit 30). Critically this means that there is no error between the sample points used for phase measurement and the datapath retiming. Alternatively, if a separate phase detector and data retiming block were used, extreme care may be required to ensure that the clock and data routing to the two sets of flip-flops was carefully balanced. This latter arrangement may introduce additional errors, however. The former above-described arrangement provides the ability to offset by exactly 0.5 UI.

Figure 20:
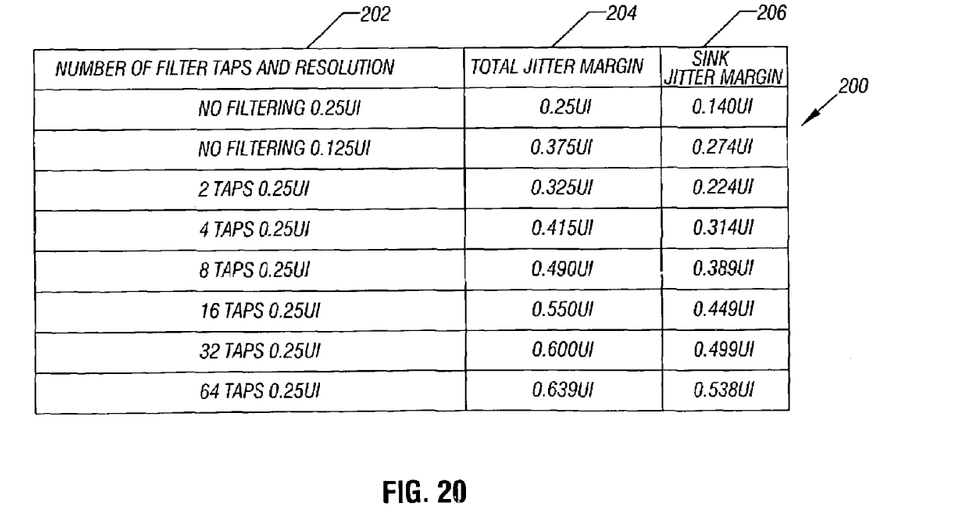
FIG. 20 is a table illustrating a performance of an averaging filter of the deskew circuit of FIG. 1 according to an embodiment of the invention.

Referring back to FIG. 1, the averaging filter 25 reduces the random errors in the phase measurement. The averaging filter 25 is optimal for attenuating random noise; and the attenuation is equal to the square root of the number of taps. Referring to FIG. 20, a table 200 shows how jitter margin can be increased by averaging several phase measurements together to yield a more accurate result. Total jitter margin is shown in column 204 and includes internal jitter; and sink jitter margin (depicted in 206) subtracts internal jitter to give a margin at the input pins.

The averaging filter 25 addresses concerns relating to the area impact on the bit slice and the impact on flexibility. Both of these concerns are addressed in the chosen implementation. To minimize area impact, a decimating solution is used, in some embodiments of the invention. An n-tap decimating averaging filter will only produce one result for every n-inputs. This avoids the need to store the last n-inputs by allowing a running total to accumulate for each input. This type of architecture is extremely compatible with an arithmetic logic unit (ALU)-based approach. Further area savings are possible by sharing the ALU sequencing and microcode across all slices. The operation of the ALU may be controlled by the state machine 20 from a 3-bit control bus to minimize impact on routing and timing.

The microcode may be set up to save results for 1, 2, 4, 8, 16, 32 and 64 point averages after 1, 2, 4, 8, 16, 32 and 64 have been received. This means that the best available $2^n$ average will always be available regardless of the number of training patterns that are sent. A possible diagram of the averaging filter 25 is shown in FIG. 21.

Figure 21:
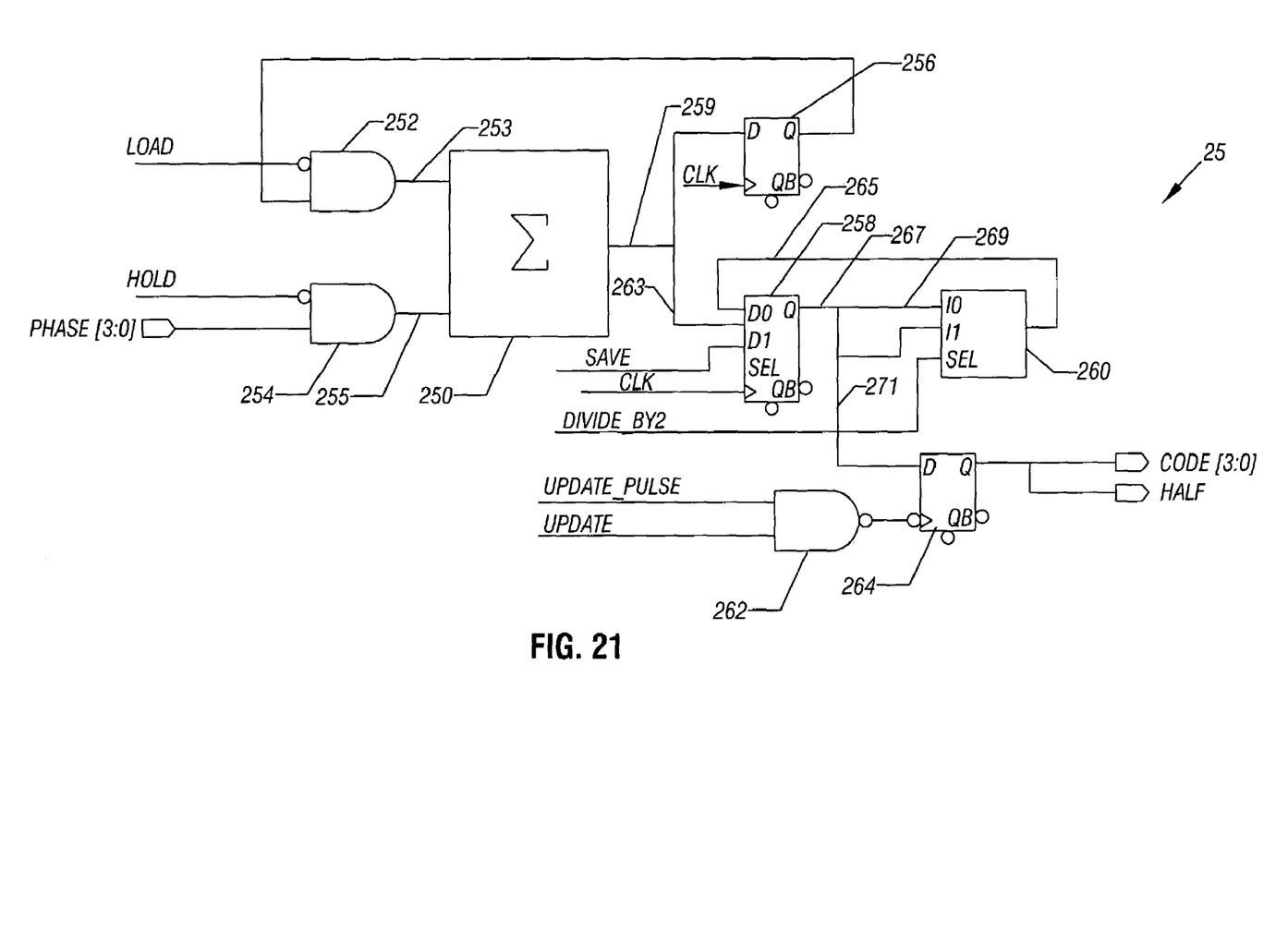
FIG. 21 is a schematic diagram of an averaging filter of the deskew circuit of FIG. 1 according to an embodiment of the invention.

Referring to FIG. 21, in some embodiments of the invention, the averaging filter 25 may include an adder 250 that adds together a digital input representative by ten input lines 253 with a digital input indicated by four input lines 255.

The input terminals 255 are provided by four output terminals of a multiple bit AND gate 254. Four input terminals of the AND gate 254 receive the four PHASE[3:0] signals. Another input terminal of the AND gate 254 receives an inverted version of a HOLD signal. The HOLD signal indicates, when asserted (driven high, for example), for the adder 250 to temporarily suspend any further additions and hold the value indicated by the out terminals 259 of the adder 250. In this manner, when the HOLD signal is asserted, the AND gate 254 provides all zeros to the input terminals 255, thereby preventing the adder 250 from furnishing a new result.

The ten input terminals 253 to the adder 250 are provided by ten corresponding output terminals of a ten bit AND gate 252 that serves as a gate to selectively prevent/allow loading of a latched result of the adder 250. This previous result is indicated by ten output terminals of a D-type flip-flop 256, and these ten output terminals are coupled to the ten input terminals of the AND gate 252. Another input terminal of the AND gate 252 receives a signal called LOAD.

When the LOAD signal is asserted (driven high, for example) the AND gate 252 is enabled to provide the previous result that is indicated by the ten input terminals of the AND gate 252 to the input terminals 253 of the adder 250. However, when the LOAD signal is deasserted (driven low, for example), the AND gate 252 provides all zeros to the input terminals 253. In some embodiments of the invention, the ten output terminals 259 of the adder 250 are provided to ten corresponding input terminals of the D-type flip-flop 256. The flip-flop 256 is clocked by the CLK clock signal. Thus, the flip-flop 250 stores the most recent value that is provided by the output terminals 259 of the adder 250.

The averaging circuit 25 also includes circuitry to divide the value indicated by the output lines 250 by two, thereby providing the capability to perform a rolling average of the PHASE[3:0] code. More specifically, in some embodiments of the invention, the ten output terminals 259 of the adder 250 are also provided to ten input terminals 263 of a multiple bit multiplexer 258. Another set of ten input terminals 265 of the multiplexer 258 are coupled to ten corresponding output terminals of a multiplexer 260.

One set of input terminals 269 of the multiplexer 260 is coupled to corresponding output terminals of the multiplexer 258. Another set of input terminals 271 of the multiplexer 260 is coupled to the nine most significant bits (MSB) from the output terminals of the multiplexer 258, along with a "0" in the most significant bit position. The select terminal of the multiplexer 260 receives a DIVIDE_BY_2 signal, a signal that is asserted to indicate a divide-by-two operation. Furthermore, the select input of the multiplexer 258 is coupled to a signal called SAVE, a signal that is asserted to save the averaged value indicated by the output terminals 267 of the multiplexer 258.

Thus, when the DIVIDE_BY_2 signal is asserted, the multiplexer 260 selects the nine most significant bits of the bit value indicated by the output terminals 267 of the multiplexer 258 to form an indication (on the output terminals of the multiplexer 260) of the signal on the output terminals of the multiplexer 258 divided by two. In response to the SAVE signal being asserted and the DIVIDE_BY_2 signals or signal being asserted, the multiplexer 258 stores the average value in response to the rising edge of the CLK signal and indicates the saved average value on the output terminals 267.

The value in turn, is provided to the input terminals of the flip-flop 264 that, in turn, provides the CODE[3:0] signals. The enable input of the flip-flop 264 is coupled to an AND gate 262 that receives as input signals called WRITE_PULSE and UPDATE. When both of these signals are asserted (driven high, for example), the flip-flop 264 is enabled to provide a new set of CODE[3:0] signals. The various control signals to control the operation of the averaging filter 25 are provided by the state machine 20 (FIG. 1), in some embodiments of the invention.

Other variations in the structure and functions of the averaging filter 25 are possible, in other embodiments of the invention.

Referring back to FIG. 1, among the other features of the circuit 10, in some embodiments of the invention, the state machine 20 may include input terminals 23 that sense various signals to detect, for example, the beginning of the training cycle, as well other events related to the deskew circuit 10. The state machine 20 also includes output terminals 21 that furnish various control signals to the components of the deskew circuit 10 for purposes of controlling the sampling of the data line 16 and the deskewing of the data. In some embodiments of the invention, the operations of the state machine 20 are clocked by the CLK clock signal.

Figure 19:
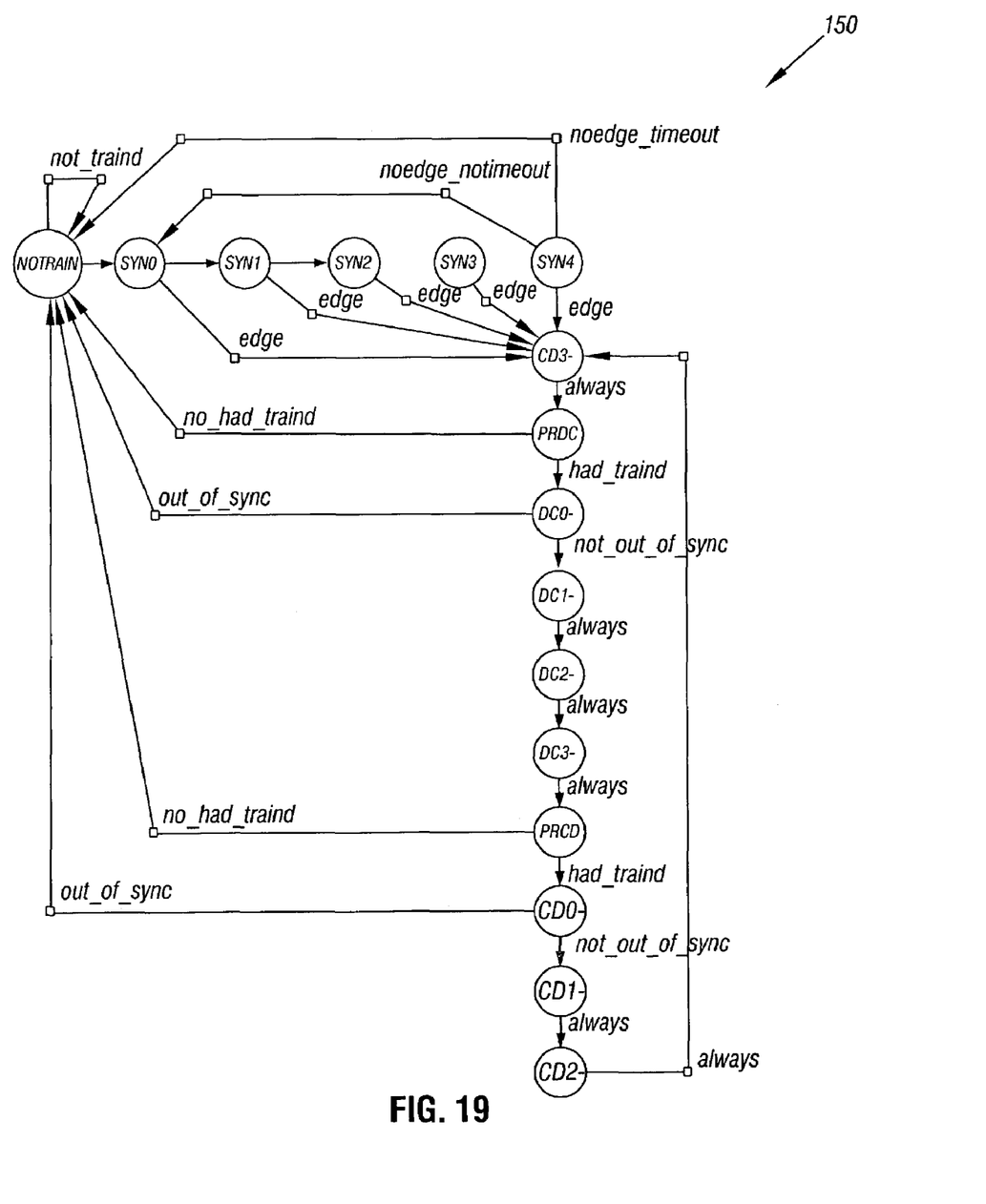
FIG. 19 is a state diagram for a state machine of the deskew circuit of FIG. 1.

More specifically, in some embodiments of the invention, the state machine 20 may be a traditional MOORE state machine, a state diagram 150 of which is depicted in FIG. 19.

Referring to FIG. 19, in some embodiments of the invention, with no occurrence of a training cycle, the state machine 20 remains in a NOTRAIN state. This is the default state, and during the NOTRAIN state, all phase measurement functions are inactive. The state machine 20 transitions from the NOTRAIN state in response to the detection of a training cycle. For example, an indication of the beginning of a training cycle may come from the bus 11. The detection of the training cycle may be asynchronous and skewed. Therefore, its timing cannot be relied upon.

Therefore, in some embodiments of the invention, the state machine 20 verifies detection of a training cycle in states, labeled SYN0, SYN1, SYN2, SYN3 and SYN4. These five synchronization states effectively form a ten cycle synchronization loop that waits for an edge to be detected in the DATA signal. In this manner, two passes are made through the synchronization states. In the first pass, control transitions from the SYN0, SYN1, SYN2, SYN3 and SYN4 states in that order in response to the non-detection of edges. In this first pass, if no edge is detected by the SYN4 state, a time out occurs and control transitions back to the SYN0 state to begin the second pass. In the second pass, controls transitions from the SYN0, SYN1, SYN2, SYN3 and SYN4 states in the listed order to the SYN4 state in response to the non-detection of edges. If no edges have been detected by the end of this second pass, a time out occurs and control transitions back to the NOTRAIN state.

On the detection of an edge in the DATA signal, control transitions from one of the above-described synchronization states to a state called CD3. From the CD3 state, control transitions to a state called PRDC. In the PRDC state, the state machine 20 asserts the appropriate signals to set up the phase detector 12 to respond to the edges. This involves selectively inverting the inputs of the phase detectors (i.e., asserting the INVERT signal) and initializing the phase detector. Edges occurring during the PRDC state prompt a return back to the NOTRAIN state.

In response to the detection of training data on the data input line 16, the state machine 20 transitions from the PRDC state to a state called DC0. The DC0 state is the first of four states (DC0–DC3) to permit the state machine 20 to detect a transition in the bus 11 from furnishing training data to furnishing training control signals. On each CLK cycle, the control transitions to the next state to the DC3 state and then subsequently to a PRCD state. In the PRCD state, the state machine 20 determines if control signals were detected. If not, control returns to the NOTRAIN state. Edges that occur during the PRCD state prompt a return to the NOTRAIN state.

If the training control signals were detected, then control transitions to a state called CD0, the first of four states (CD0–CD3) in which the state machine 20 detects any training data on the bus 11. If no training is detected in the subsequent PRDC state, control returns to the NOTRAIN state.

Figure 22:
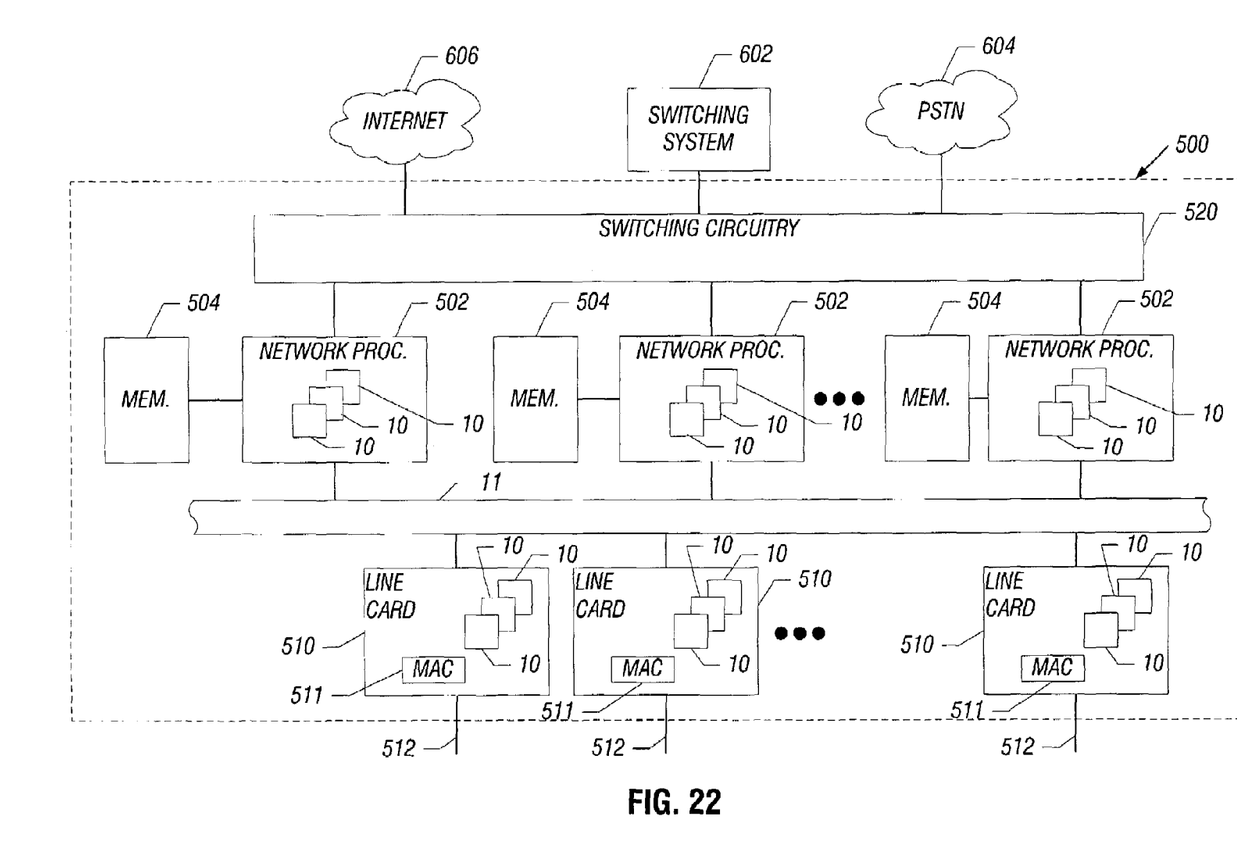
FIG. 22 is a schematic diagram of a switching system according to an embodiment of the invention.

Referring to FIG. 22, in some embodiments of the invention, the deskew circuit 10 may be used in a switching system 500. In this manner, several of the deskew circuits 10 may be used in receiving interfaces of devices that are connected to the bus 11. The bus 11 may be an SPI-4 Phase 2 bus to communicate information between link and physical layers of a particular network protocol. For example, in some embodiments of the invention, the switching system 500 may include several network processors 502, each of which may be associated with a particular network protocol. As examples, one network processor 502 may be associated with an Ethernet protocol, another network processor 502 may be associated with a Synchronous Optical NETwork (SONET), etc. The optical Ethernet protocol is described in the Institute of Electrical and Electronics Engineers, Inc. (IEEE) Std. 802.3, 2000 Edition, published on Oct. 20, 2000, and in the IEEE 802.3(a)(e) Supplement, dated Jun. 12, 2002. The SONET standard refers to, for example, the American National Standards Institute (ANSI) T1.105-1995 Synchronous Optical NETwork (SONET) standard, published in 1995.

Each network processor 502 may include multiple deskew circuits 10, each of which is associated with recovering bits of data from an associated data line of the bus 11. As an example, each network processor 502 may be coupled to its own associated memory 504, such as a dynamic random access memory (DRAM), for example.

The system 500 may also include, for example, line cards 510, each of which is coupled to the bus 11. Each line card 510 may include, for example, a media access controller (MAC) 511, and each line card 510 may include multiple deskew circuits 10, each of which performs the function of recovering bits from an associated data line of the bus 11. Each line card 510 may be associated with a particular network protocol such as an Ethernet or an SONET protocol, for example; and each line card 510 may be coupled to a network line 512 that is also associated with this network protocol.

Among its other features, the switching system 500 may include a switching circuit 520 that is coupled to the network processors 502. As an example, the switching circuitry 520 may communicate packets between the network processors 502 and circuitry external to the switching system 500, such as another switching system 602, a Public Switching Telephone Network (PSTN) 604 and devices of the Internet 606, as just a few examples.

Other variations of the switching system 500 are possible. Furthermore, the above-described deskew circuits 10 may be used in applications other than in switching systems. For example, the deskew circuit 10 may be used to recover bits of data from a data line of any bus in which the data and clock signals at the deskew circuit 10 may not be synchronized. Therefore, many other applications and uses of the deskew circuit 10 are possible and are within the scope of the appended claims.

While the present invention has been described with respect to a limited number of embodiments, those skilled in the art, having the benefit of this disclosure, will appreciate numerous modifications and variations therefrom. It is intended that the appended claims cover all such modifications and variations as fall within the true spirit and scope of this present invention.

What is claimed is:

1. A method comprising:
   receiving a first signal from a data signal line during a training cycle, the first signal including an edge indicative of a transition between logical states;
   sampling the first signal at different times to form a first plurality of sampled signals;
   in response to the sampled signals, selecting a subset of the times;
   during a cycle other than the training cycle, sampling data from the data signal line at the different times to form a second plurality of sampled signals; and
   based on the selected subset, selecting at least one of the second plurality of sampled signals.

2. The method of claim 1, further comprising:
   receiving a first clock signal from a clock signal line associated with the data signal line;
   generating second clock signals from the first clock signal, each of the second clock signals being associated with one of the times; and
   triggering the sampling of the first signal with the second clock signals.

3. The method of claim 1,
   wherein the subset of the times comprises two times per period of a clock signal associated with the data signal.

4. The method of claim 3, wherein one of the two times is associated with a rising edge of the clock signal and the other one of the two times is associated with a falling edge of the clock signal.

5. The method of claim 1, wherein the data signal line communicates a data signal indicative of a first set of data associated with falling clock edges and a second set of data interleaved with the first set of data associated with rising clock edges.

6. The method of claim 1, wherein the selecting comprises:
   generating a code in response to the sampled signals indicative of the location in time of the edge of the first signal.

7. The method of claim 6, wherein the generating the code comprises generating a digital indication.

8. The method of claim 6, wherein the selecting further comprises:
   adding an offset to the code indicative of a predetermined unit of time to generate another code indicative of the selected subset of times.

9. The method of claim 8, wherein the generating said another code comprises generating a digital indication.

10. The method of claim 1, further comprising:
    in response to the sampled signals, generating a code indicative of the subset of the times.

11. The method of claim 10, further comprising:
    performing the generation of the code repeatedly; and
    averaging the generated codes to produce an average value for the codes.

12. The method of claim 1, wherein the sampling comprises sampling over multiple sampling windows and discarding samples from at least one of the sampling windows.

13. An apparatus comprising:
    a sampling circuit to:
       receive a first signal from a data signal line during a training cycle, the first signal indicating an edge indicative of a transition between logical states, and
       sample the first signal at different times to form a first plurality of sampled signals; and
    an encoder:
       to in response to the first plurality of sampled signals, select a subset of the times;
       during a cycle other than the training cycle, sample data from the data signal line at the different times to form a second plurality of sampled signals; and
       based on the selected subset, select at least one of the second plurality of sampled signals.

14. The apparatus of claim 13, wherein the sampling circuit comprises:
    a clock phase generator to receive a first clock signal from a clock signal line associated with the data signal line and generate second clock signals from the first clock signals, each of the second clock signals being associated with one of the clock phases.

15. The apparatus of claim 14, wherein the sampling circuit triggers the sampling of the first signal with the second clock signals.

16. The apparatus of claim 13, wherein the subset of the times comprises two times per period of a clock signal associated with the data signal.

17. The apparatus of claim 16, wherein one of the two times is associated with a rising edge of the clock signal and the other one of the two edges is associated with a falling edge of the clock signal.

18. The apparatus of claim 13, wherein the sampling circuit comprises:
    a multiplexing circuit to use the subset of times to recover bits of data from the data signal line.

19. The apparatus of claim 13, wherein the encoder selects the subset of times in response to the occurrence of a training cycle.

20. The apparatus of claim 13, wherein the data line communicates a data signal indicative of a first set of data associated with falling clock edges and a second set of data interleaved with the first set of data associated with rising clock edges.

21. The apparatus of claim 13, wherein the encoder generates a code in response to the sampled signals indicative of the location in time of the edge of the first signal.

22. The apparatus of claim 21, wherein the first code comprises a digital indication.

23. The apparatus of claim 21, wherein the encoder adds an offset to the code indicative of a predetermined unit of time to generate another code indicative of the selected subset of times.

24. The apparatus of claim 23, wherein said another code comprises a digital indication.

25. The apparatus of claim 13, wherein the encoder generates a code indicative of the subset of times.

26. The apparatus of claim 25, wherein the encoder performs the generation of the code repeatedly, and the apparatus further comprises:
a filter to average the generated codes to produce an average value for the codes.

27. A system comprising:
a processor;
a DRAM memory coupled to the processor storing data; and
a network interface comprising:
a sampling circuit to:
receive a first signal from a data signal line during a training cycle, the first signal indicating an edge indicative of a transition between logical states, and sample the first signal at different times to form a first plurality of sampled signals; and
an encoder:
to in response to the first plurality of sampled signals, select a subset of the times;
during a cycle other than the training cycle, sample data from the data signal line at the different times to form a second plurality of sampled signals; and
based on the selected subset, select at least one of the second plurality of sampled signals.

28. The system of claim 27, wherein the sampling circuit further comprises:
a clock generator to receive a first clock signal from a clock signal line of the bus and generate second clock signals from the first clock signals, each of the second clock signals being associated with one of the clock phases,
wherein the sampling circuit triggers the sampling of the first signal with the second clock signals.

29. The system of claim 27, wherein the system comprises a network processor.

30. The system of claim 27, wherein the system comprises a line card.

* * * * *